(12) United States Patent
Orvedahl (10) Patent No.: US 10,746,149 B2
(45) Date of Patent: Aug. 18, 2020

(54) ENGINE-DRIVEN WELDING-TYPE POWER SUPPLIES WITH SECONDARY ENERGY GENERATION

(71) Applicant: Illinois Tool Works Inc., Glenview, IL (US)

(72) Inventor: Travis Orvedahl, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/384,937

(22) Filed: Dec. 20, 2016

(65) Prior Publication Data

US 2018/0171957 A1    Jun. 21, 2018

(51) Int. Cl.
| | | |
|---|---|---|
| *F02N 11/00* | (2006.01) | |
| *H02K 7/18* | (2006.01) | |
| *B23K 9/10* | (2006.01) | |

(52) U.S. Cl.
CPC .......... *F02N 11/003* (2013.01); *B23K 9/1006* (2013.01); *H02K 7/1815* (2013.01)

(58) Field of Classification Search
CPC .. H02K 7/1815; B23K 9/1081; B23K 9/1006; F02N 11/003
USPC ................. 320/137; 219/133, 130.1, 130.4
See application file for complete search history.

(56) References Cited

U.S. PATENT DOCUMENTS

| | | |
|---|---|---|
| 3,477,005 A | 11/1969 | Weems |
| 3,829,652 A | 8/1974 | Terry |
| 4,216,368 A | 8/1980 | Delay |
| 5,643,119 A | 7/1997 | Yamaguchi et al. |
| 5,856,709 A * | 1/1999 | Ibaraki ..................... B60K 6/36 180/165 |
| 6,512,199 B1 | 1/2003 | Blazina |
| 7,517,298 B2 | 4/2009 | Ortmann |
| 7,882,910 B2 | 2/2011 | Kluge et al. |

(Continued)

FOREIGN PATENT DOCUMENTS

| | | |
|---|---|---|
| CN | 101596855 | 12/2009 |
| CN | 202780171 | 3/2013 |

(Continued)

OTHER PUBLICATIONS

Control of Hybrid Electrical Vehicles; Gheorghe Livint, Vasile Horga, M. Ratoi and M. Albu; Gheorghe Asachi Technical Univ. of Lasi, Romania; Intech; Electric Vehicles—Modelling and Simulations; Sep. 2011.

(Continued)

*Primary Examiner* — Dana Ross
*Assistant Examiner* — Joseph W Iskra
(74) *Attorney, Agent, or Firm* — McAndrews, Held & Malloy, Ltd.

(57) ABSTRACT

Methods and systems for engine-driven welding-type power supplies with secondary energy generation are disclosed. An example engine-driven welding-type power supply includes a primary energy generation system comprising an internal combustion engine configured to generate mechanical power, a generator configured to convert the mechanical power from the internal combustion engine to electric power, a welding-type power conditioning circuit to convert the electric power to welding-type power, and a secondary energy generation system configured to supplement the mechanical power output by the internal combustion engine.

17 Claims, 6 Drawing Sheets

(56) References Cited

U.S. PATENT DOCUMENTS

| | | | |
|---|---|---|---|
| 8,004,219 B2 | 8/2011 | Mattson | |
| 8,640,799 B2 * | 2/2014 | Beeson | B23K 9/1006 180/53.5 |
| 2005/0263513 A1 | 12/2005 | Leisner | |
| 2005/0263514 A1 | 12/2005 | Albrecht | |
| 2006/0037953 A1 * | 2/2006 | Matthews | B23K 9/1006 219/133 |
| 2008/0087655 A1 | 4/2008 | Trinkner | |
| 2009/0008374 A1 * | 1/2009 | Fosbinder | B23K 9/1006 219/130.21 |
| 2010/0155384 A1 * | 6/2010 | Albrecht | B23K 9/1006 219/133 |
| 2011/0114607 A1 | 5/2011 | Albrecht | |
| 2011/0301792 A1 | 12/2011 | Yamazaki | |
| 2011/0309055 A1 | 12/2011 | Rozmarynowski | |
| 2014/0076875 A1 | 3/2014 | Gale et al. | |
| 2015/0069033 A1 * | 3/2015 | Stockton | B23K 9/1006 219/133 |
| 2015/0069037 A1 | 3/2015 | Farah et al. | |
| 2015/0069038 A1 | 3/2015 | Burkhart et al. | |
| 2015/0231725 A1 * | 8/2015 | Hruska | B23K 9/1006 219/134 |

FOREIGN PATENT DOCUMENTS

| | | | |
|---|---|---|---|
| DE | 102011053657 | | 3/2013 |
| EP | 2275315 | * | 1/2011 |
| FR | 2742100 | | 6/1997 |
| GB | 2410298 | | 7/2005 |
| WO | 2008036202 | | 3/2008 |
| WO | 2008156946 | | 12/2008 |
| WO | 2010151828 | | 12/2010 |
| WO | 2011102869 | | 8/2011 |

OTHER PUBLICATIONS

PCT/IB2015/000181, Int'l Search Report and Written Opinion of the Int'l Searching Authority dated Jul. 24, 2015.

Int'l Search Report and Written Opinion Appln No. PCT/US2017/067258 dated May 2, 2018 (14 pgs.).

* cited by examiner

ENGINE-DRIVEN WELDING-TYPE POWER SUPPLIES WITH SECONDARY ENERGY GENERATION

BACKGROUND

Conventional engine driven welding power sources require the prime mover to be sized to meet the maximum demand independently of the continuous rating because the prime mover needs enough power overhead to prevent stall.

SUMMARY

Methods and systems are provided for engine-driven welding-type power supplies with secondary energy generation, substantially as illustrated by and described in connection with at least one of the figures, as set forth more completely in the claims.

DETAILED DESCRIPTION

Disclosed example engine-driven welding power supplies are hybrid systems including a prime mover and one or more secondary movers. Disclosed example engine-driven welding power supplies include an energy storage medium to power a secondary mover to provide additional energy (e.g., power, torque, maximum load capacity) into the system to improve dynamic response, enable prime mover-inhibited operation, and/or higher peak energy levels to be delivered to the work and weld power. Disclosed example engine-driven welding power supplies can be used for, for example, improved cold weather starting of the prime mover, battery charging, and/or jump starting of other engines.

Disclosed example hybrid systems include an energy storage medium, a secondary mover, and a secondary mover controller. The hybrid system is connected in series with the mechanical output of the prime mover (e.g., engine drive) and provides supplemental mechanical power to the engine-driven welding power supply system.

Welding-type power, as used herein, refers to power suitable for welding, plasma cutting, induction heating, air carbon-arc cutting and/or gouging (CAC-A), cladding, and/or hot wire welding/preheating (including laser welding and laser cladding).

Disclosed example engine-driven welding-type power supplies include a primary energy generation system comprising an internal combustion engine configured to generate mechanical power, a generator configured to convert the mechanical power from the internal combustion engine to electric power, a welding-type power conditioning circuit to convert the electric power to welding-type power; and a secondary energy generation system configured to supplement the mechanical power output by the internal combustion engine.

Some example engine-driven welding-type power supplies further include an energy storage device, where the secondary energy generation system supplements the mechanical power using energy from the energy storage device. In some such examples, the energy storage device includes at least one of a battery, a kinetic storage device, a capacitor, a super capacitor, or a fuel cell.

Some example engine-driven welding-type power supplies further include a controller configured to control the secondary energy generation system to provide supplemental mechanical power during a startup period of the primary energy generation system while the internal combustion engine increases speed to a commanded speed. Some example engine-driven welding-type power supplies further include a clutch to selectively couple the primary energy generation system to the secondary energy generation system and the generator. Some example engine-driven welding-type power supplies further include a clutch to selectively couple the primary energy generation system and the secondary energy generation system to the generator.

Some example engine-driven welding-type power supplies further include an auxiliary power circuit configured to convert the electric power to at least one of alternating current (AC) electric power or direct current (DC) electric power. In some examples, the generator is configured to output AC electric power. In some examples, the secondary energy generation system includes at least one of an air-driven motor, a hydraulic motor, an electric motor, or a second internal combustion engine. In some such examples, the primary energy generation system provides the mechanical power to the at least one of the air-driven motor, the hydraulic motor, or the electric motor.

Some example engine-driven welding-type power supplies further include a controller configured to control the secondary energy generation system based on a load on the primary energy generation system exceeding a rated load. Some example engine-driven welding-type power supplies further include a controller configured to control the secondary energy generation system to reduce a torque oscillation of the primary energy generation system by controlling the secondary energy generation system to generate an oscillating torque having a phase shift relative to the torque oscillation of the primary energy generation system. Some example engine-driven welding-type power supplies further include a controller configured to control the secondary energy generation system to provide the mechanical power while the primary energy generation system is not providing the mechanical power.

In some examples, the generator includes a first winding and a second winding, and the welding-type power conditioning circuit is coupled to the first winding and the secondary energy generation system coupled to the second winding. Some such examples further include a clutch configured to selectively couple the primary energy generation system to the generator. In some examples, the generator outputs single-phase AC power or three-phase AC power.

Disclosed example methods to operate a hybrid engine-driven welding-type power supply include: controlling a secondary energy generation system to provide supplemental mechanical power to a first load on a primary energy generation system when the first load is greater than a first threshold load associated with the primary energy generation system, the primary energy generation system comprising an internal combustion engine configured to generate primary mechanical power, where the first load including welding-type output power, and decoupling the primary mechanical power from a second load when the second load is less than a second threshold load associated with the secondary energy generation system.

Some example methods further include controlling the secondary energy generation system to reduce a torque oscillation of the primary energy generation system by controlling the secondary energy generation system to generate an oscillating torque having a phase shift relative to the torque oscillation of the primary energy generation system. In some examples, controlling the secondary energy generation system to provide the supplemental mechanical power involves inputting power to at least one of a pneumatic pump, a hydraulic pump, an electric motor, or a second internal combustion engine. In some such examples, the second load comprises at least one of the pneumatic pump, the hydraulic pump, auxiliary electric power, or welding-type power.

Figure 1:
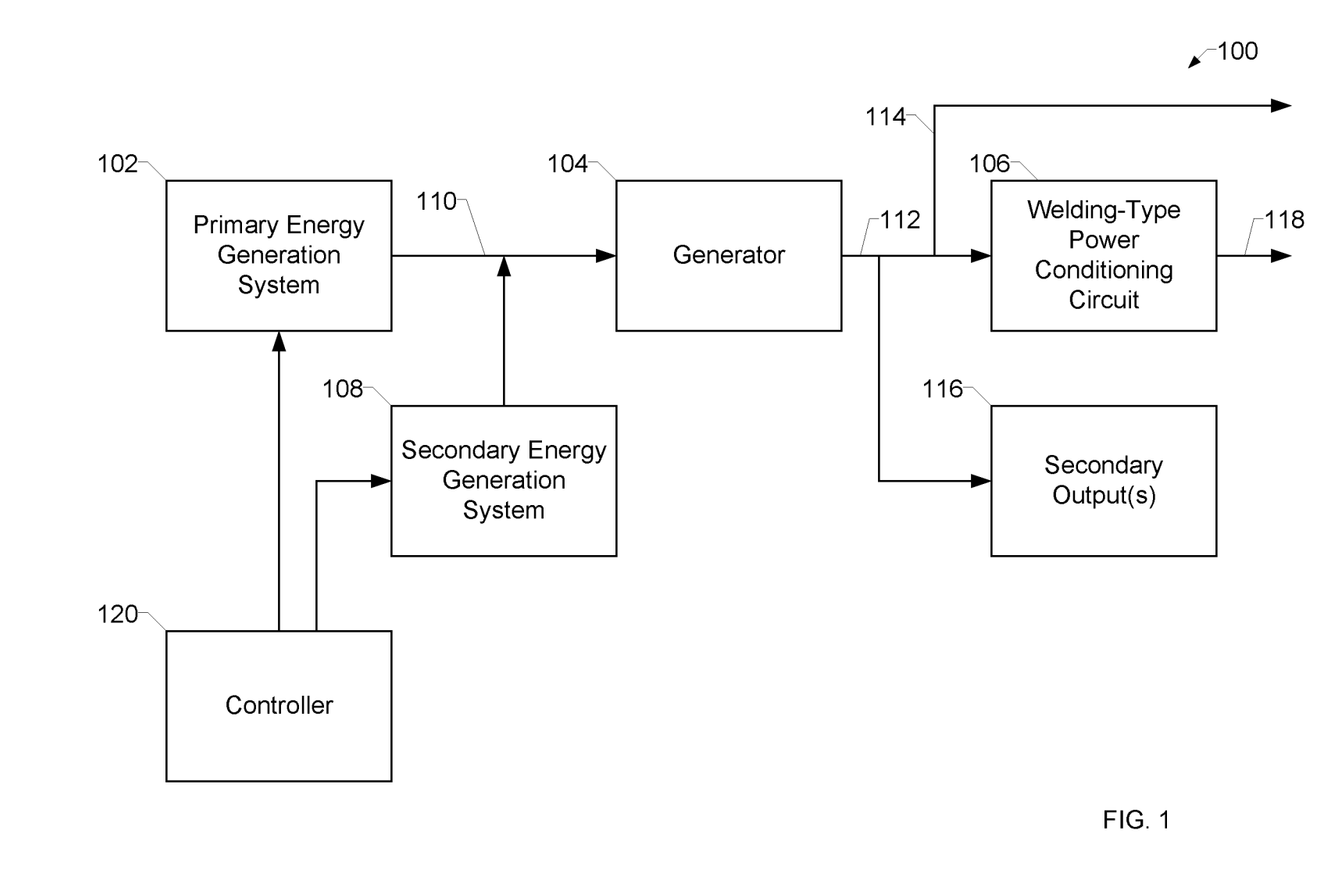
FIG. 1 is a block diagram of an example engine-driven welding-type power supply with secondary energy generation, in accordance with aspects of this disclosure.

FIG. 1 is a block diagram of an example engine-driven welding-type power supply 100 with secondary energy generation.

The example power supply 100 of FIG. 1 includes a primary energy generation system 102, a generator 104, a welding-type power conditioning circuit 106, and a secondary energy generation system 108.

The example primary energy generation system 102 is an internal combustion engine configured to generate mechanical power 110 (e.g., convert chemical energy to mechanical energy). The primary energy generation system 102 is also referred to herein as an internal combustion engine 102.

The generator 104 is mechanically coupled to the primary energy generation system 102 (e.g., via a driveshaft or other mechanical linkage), and converts the mechanical power from the internal combustion engine 102 to electric power 112. In the example of FIG. 1, the generator 104 outputs the electric power 112 to the welding-type power conditioning circuit 106, as auxiliary power 114, and/or to one or more secondary output(s) 116. As illustrated in FIG. 1, the auxiliary power 114 may be obtained directly from the generator 104. Alternatively, the power supply 100 may include one or more auxiliary power circuits to convert the electric power 112 from the generator 104 to alternating current (AC) electric power and/or to direct current (DC) electric power. Example auxiliary power 114 includes 110 VAC, 220 VAC, and/or 230 VAC power having a frequency of 50 Hz or 60 Hz. Example secondary outputs 116 include electrically powered air compressors and/or electrically powered hydraulic pumps.

The welding-type power conditioning circuit 106 converts the electric power (from the generator 104) to welding-type power 118. For example, the welding-type power conditioning circuit 106 may be an inverter-based and/or switching regulator-based. In some examples, the welding-type power conditioning circuit 106 is omitted and the generator 104 provides the electric power 112 to a pneumatic output, a hydraulic output, and/or an auxiliary (e.g., non-welding) output.

The secondary energy generation system 108 supplements the mechanical power output by the internal combustion engine 102. The example secondary energy generation system 108 may include any source of mechanical power, such as one or more internal combustion engines, electric motors, pneumatic motors, and/or hydraulic motors. In some examples, the secondary output(s) 116 and the secondary energy generation system 108 share one or more of the electric motor(s), the pneumatic motor(s), and/or the hydraulic motor(s). For example, inputting mechanical power to a hydraulic motor causes the components to serve as the secondary output(s) 116, and inputting hydraulic power to the hydraulic motor causes the hydraulic motor to output mechanical power (e.g., to the generator 104 in the example of FIG. 1).

The example power supply 100 further includes a controller 120 to control the primary energy generation system 102 and/or the secondary energy generation system 108. The controller 120 may control the secondary energy generation system 108 to provide supplemental mechanical power during a startup period of the primary energy generation system 102 while the internal combustion engine 102 increases speed to a commanded speed.

Conventional engine-driven welders can cause torque oscillation in certain circumstances, in which the speed of the engine is such that the engine vibrates or shakes. Conventional engine torque resembles a square wave where, at low engine speeds (e.g., RPM), the dead time between cylinder firing is long enough to cause the engine to shake or oscillate back and forth on the mounts with a low frequency harmonic. The example controller 120 may control the secondary energy generation system 108 to reduce torque oscillation of the primary energy generation system 102 by controlling the secondary energy generation system 108 to inject torque from the secondary energy generation system 108 during the dead times or between cylinder firing to cancel the low frequency harmonic that causes the shaking. Using an electric motor/generator as an example, the controller 120 controls the secondary energy generation system 108 such that the torque oscillates between the mechanical power generation mode (e.g., motoring quadrant) and the electric power generation mode (e.g., regenerating quadrant) to alternate between absorbing power and delivering power. Thus, the controller 120 controls the secondary energy generation system 108 to generate an oscillating torque having a phase shift, or a compensatory torque, relative to the torque oscillation of the primary energy generation system 102.

Additionally or alternatively, the controller 120 may control the secondary energy generation system 108 to provide supplemental mechanical power when a load on the primary energy generation system 102 exceeds a rated load on the primary energy generation system 102. In this manner, the controller 120 enables the secondary energy generation system 108 to increase the capacity of the power supply 100 without increasing the size of the primary energy generation system 102.

In some examples, the controller 120 controls the secondary energy generation system 108 to provide the mechanical power while the primary energy generation system 102 is not providing the mechanical power. For example, the secondary energy generation system 108 may be used for smaller loads to conserve running time on the primary energy generation system 102, to reduce wear on the primary energy generation system 102, and/or reducing fuel consumption.

Figure 2:
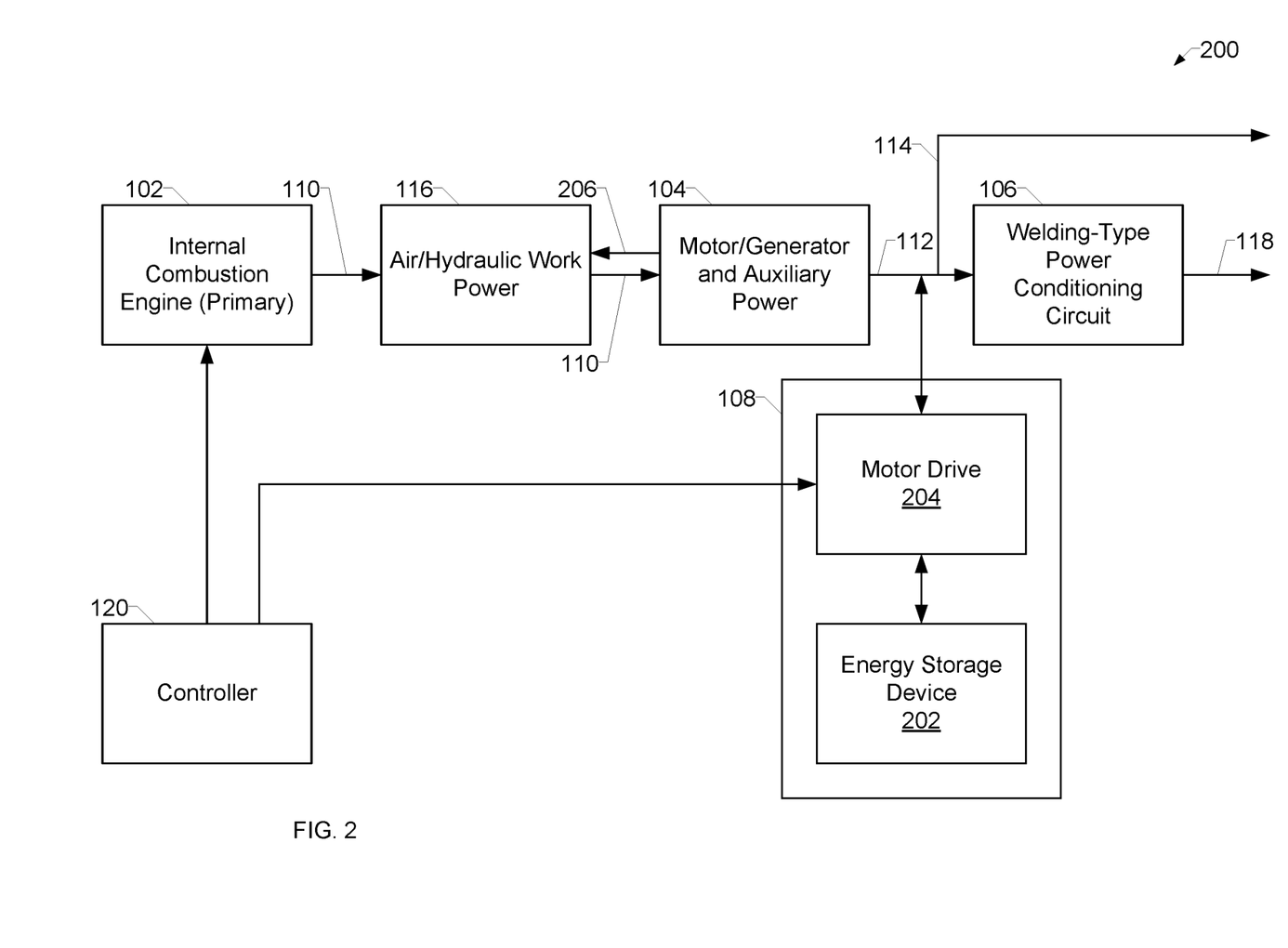
FIG. 2 is a block diagram of an example engine-driven welding-type power supply with a secondary energy generation device electrically coupled to a generator, in accordance with aspects of this disclosure.

FIG. 2 is a block diagram of an example engine-driven welding-type power supply 200 with the secondary energy generation system 108 electrically coupled to the generator 104. The example power supply 200 of FIG. 2 includes the primary energy generation system 102, the generator 104 (e.g., a motor/generator), the welding-type power conditioning circuit 106, the secondary energy generation system 108, the secondary outputs 116 (e.g., as air/hydraulic power), and the controller 120.

In the example of FIG. 2, the secondary energy generation system 108 includes an energy storage device 202 and a motor drive 204. The secondary energy generation system 108 supplements the mechanical power 110 output by the primary energy generation system 102 using energy from the energy storage device 202. The energy storage device 202 may be a high voltage or low voltage storage device, and may include one or more of a battery, a kinetic storage device, a capacitor, a super capacitor, a fuel cell, or any other energy storage device.

The motor drive 204 may be, for example, a voltage source inverter circuit that converts power from the energy storage device 202 to drive the motor/generator 104 to generate supplemental mechanical power 206. The supplemental mechanical power supplements the mechanical power 110 output by the primary energy generation system 102 for driving, for example, the secondary output(s) 116 (e.g., the air/hydraulic work power) to increase the peak power available to the secondary output(s) 116. In some examples, the power supply 200 includes a charging circuit to charge the energy storage device 202 when the primary energy generation system 102 has excess capacity (e.g., not being used, or a load on the primary energy generation system 102 is less than the capacity of the primary energy generation system 102).

Figure 3:
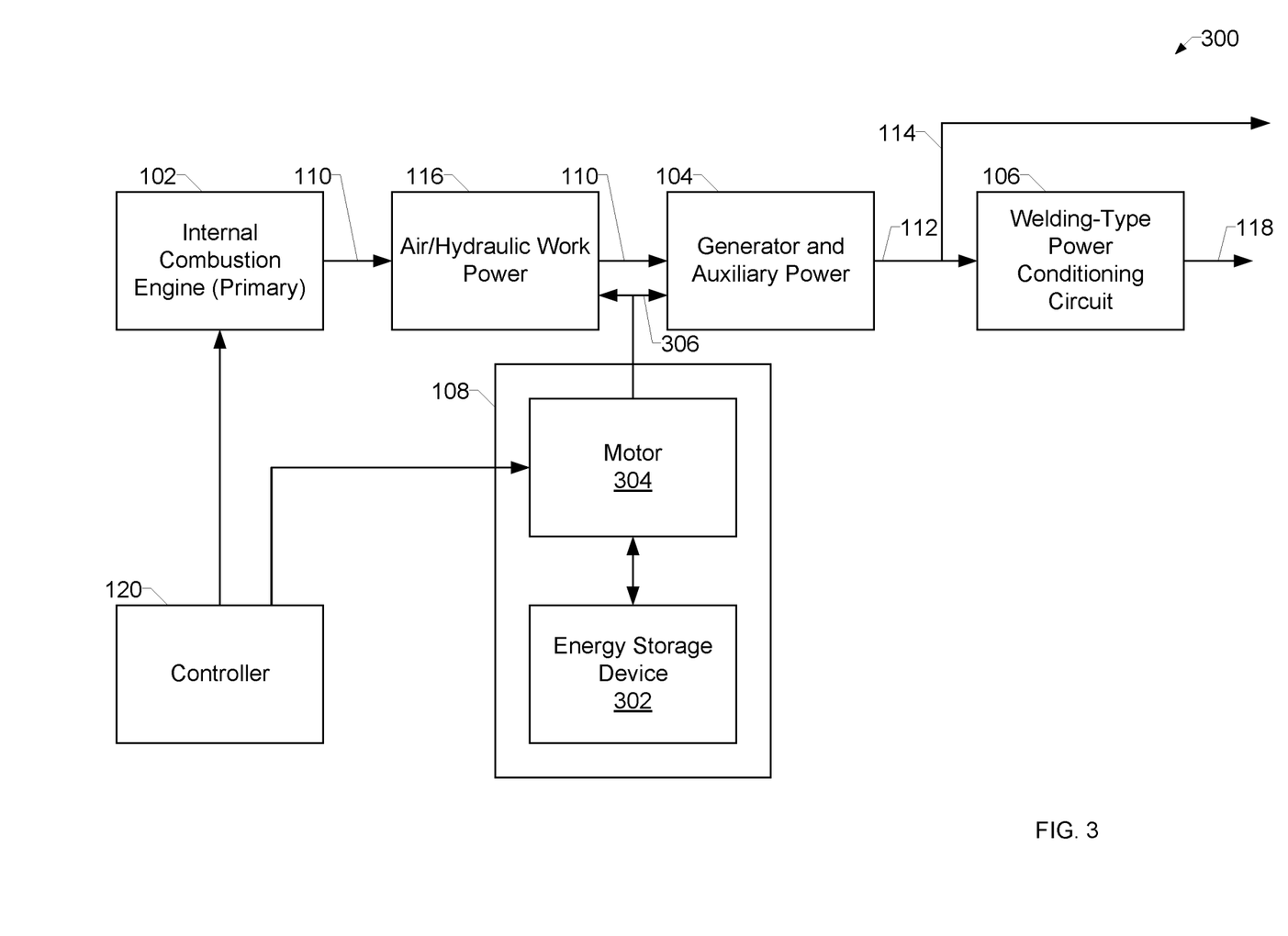
FIG. 3 is a block diagram of an example engine-driven welding-type power supply with a secondary energy generation device mechanically to a generator, in accordance with aspects of this disclosure.

FIG. 3 is a block diagram of an example engine-driven welding-type power supply 300 with a secondary energy generation system 108 mechanically coupled to the generator 104. The example engine-driven welding-type power supply 300 of FIG. 3 includes the primary energy generation system 102, the generator 104, the welding-type power conditioning circuit 106, the secondary energy generation system 108, the secondary outputs 116 (e.g., as air/hydraulic power), and the controller 120.

In the example of FIG. 3, the secondary energy generation system 108 includes an energy storage device 302 and a motor 304. The secondary energy generation system 108 is configured to output supplemental mechanical power 306 to the generator 104 and/or to the secondary output(s) 116.

The example generator 104 of FIG. 3 may output single-phase alternating current power or three-phase alternating current power. The generator 104 may include multiple primary windings. For example, the welding-type power conditioning circuit 106 may be coupled to a first primary winding and the secondary energy generation system 108 may be coupled to a second primary winding. The motor 304 is configured to supply the same type of alternating current power as the generator 104 to drive the generator 104 as an electric motor to generate the supplemental mechanical power 306 via the second winding.

Figure 4:
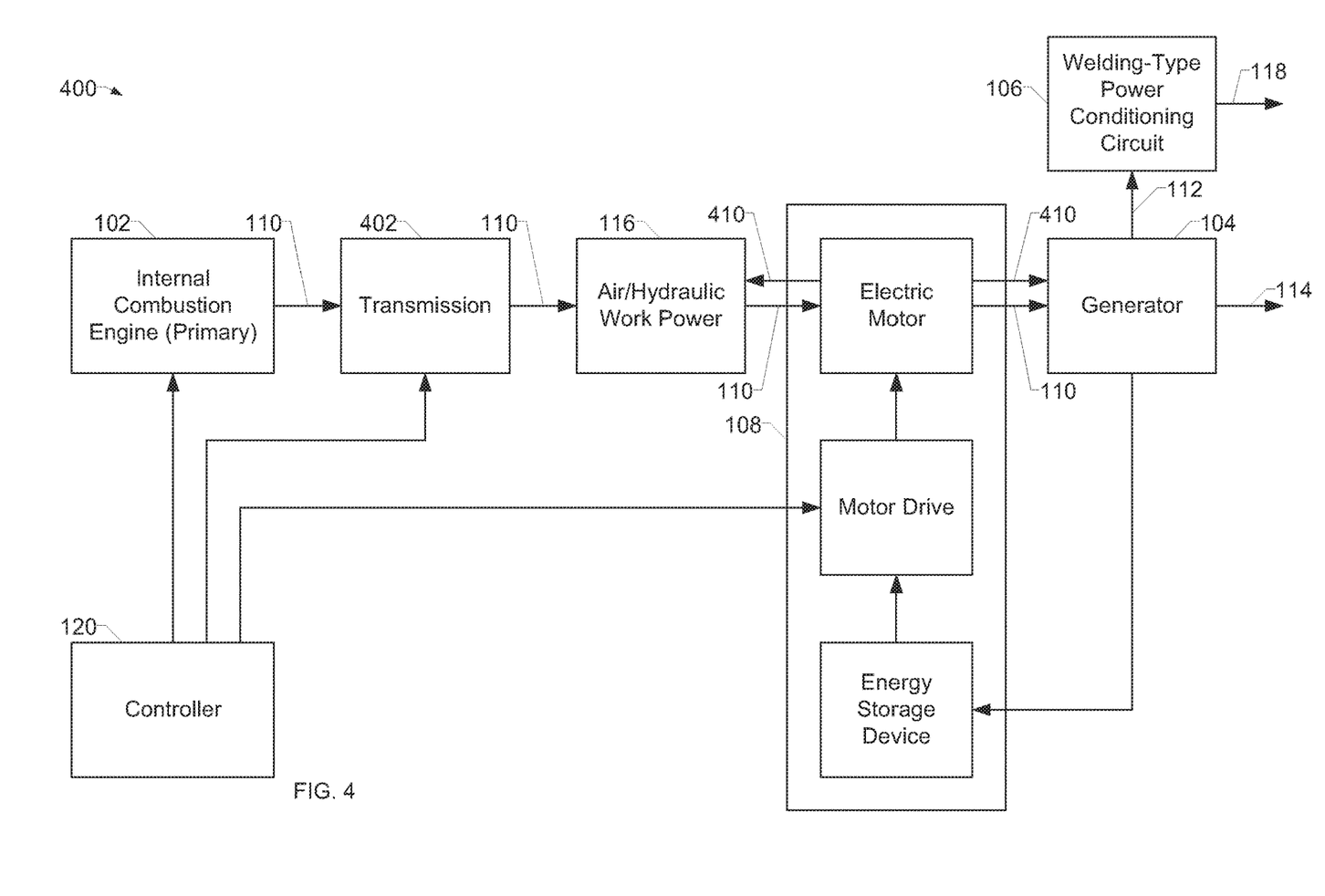
FIG. 4 is a block diagram of an example engine-driven welding-type power supply with a secondary energy generation device and a transmission to selectively couple a primary energy generation device and/or the secondary energy generation device to power output devices, in accordance with aspects of this disclosure.

FIG. 4 is a block diagram of another example engine-driven welding-type power supply 400. The engine-driven welding-type power supply 400 of FIG. 4 includes the primary energy generation system 102, the generator 104, the welding-type power conditioning circuit 106, the secondary energy generation system 108, the secondary outputs 116 (e.g., as air/hydraulic power), and the controller 120. The engine-driven welding-type power supply 400 further includes a transmission 402 to selectively couple the primary energy generation system 102 to the secondary outputs 116, the secondary energy generation system 108, and/or the generator 104. The transmission 402 may include a clutch or other mechanical linkage to engage and/or disengage the primary energy generation system 102.

The secondary energy generation system 108 of FIG. 4 includes an energy storage device 404, a motor drive 406, and an electric motor 408. The motor drive 406 converts electric power from the energy storage device 404 to drive the electric motor 408, which generates supplemental mechanical power 410. The transmission 402 enables the supplemental mechanical power 410 to be disengaged from the primary energy generation system 102 (e.g., to increase the torque available to the generator 104 and/or to the secondary output(s) 116.

Figure 5:
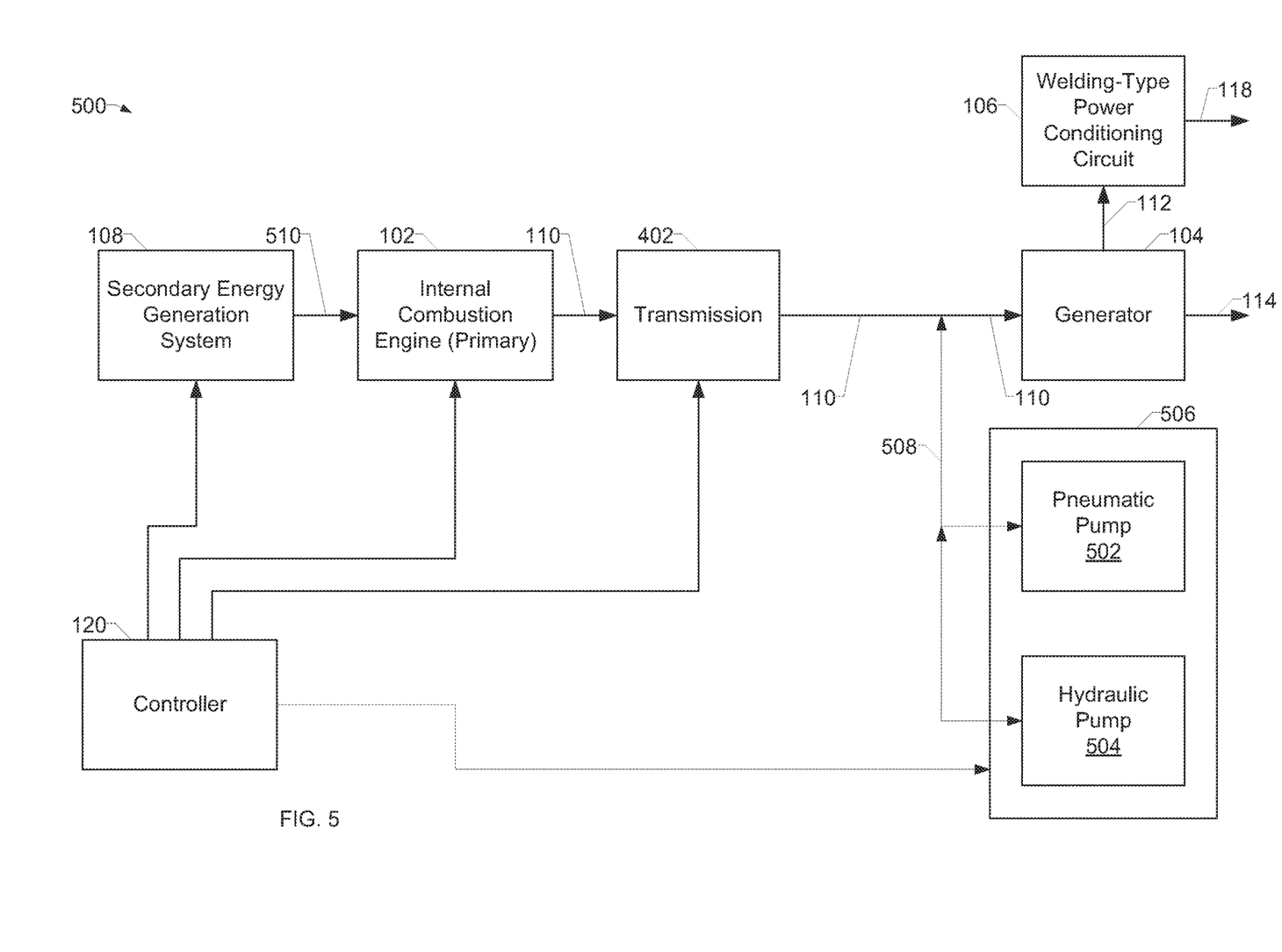
FIG. 5 is a block diagram of another example engine-driven welding-type power supply with a secondary energy generation device, in accordance with aspects of this disclosure.

FIG. 5 is a block diagram of another example engine-driven welding-type power supply 500. The engine-driven welding-type power supply 500 includes the primary energy generation system 102, the generator 104, the welding-type power conditioning circuit 106, the secondary energy generation system 108, the secondary outputs 116 (e.g., as air/hydraulic power), and the controller 120 of FIG. 1, and the transmission 402 of FIG. 4. In the example of FIG. 5, the transmission 402 includes a clutch to selectively couple both the primary energy generation system 102 and the secondary energy generation system 108 to the generator 104 and/or to the secondary output(s) 116. In some examples, the secondary output(s) 116 of FIG. 5, such as a pneumatic pump 502 and/or a hydraulic pump 504, further function as a tertiary energy generation system 506 to provide supplemental mechanical power 508 to the generator 104 and/or to other ones of the secondary output(s) 116 (e.g., from a pneumatic pump to a hydraulic pump).

In the example of FIG. 5, the secondary energy generation system 108 is coupled to provide supplemental mechanical power 510 to supplement the mechanical power 110 output by the primary energy generation system 102. The controller 120 controls the primary energy generation system 102, the secondary energy generation system 108, the transmission 402, and/or the tertiary energy generation system 506 to control the generation of the mechanical power 110 and/or the generation of the supplemental mechanical power 508, 510, and/or the coupling of the mechanical power 110 and/or the supplemental mechanical power 508 to the generator 104 and/or to the secondary outputs 116.

In some other examples, the transmission 402 may be omitted from the systems of FIGS. 4 and/or 5, and the primary energy generation system 102 and/or the secondary energy generation system 108 are directly mechanically linked to the generator 104 and/or the secondary output(s) 116.

Figure 6:
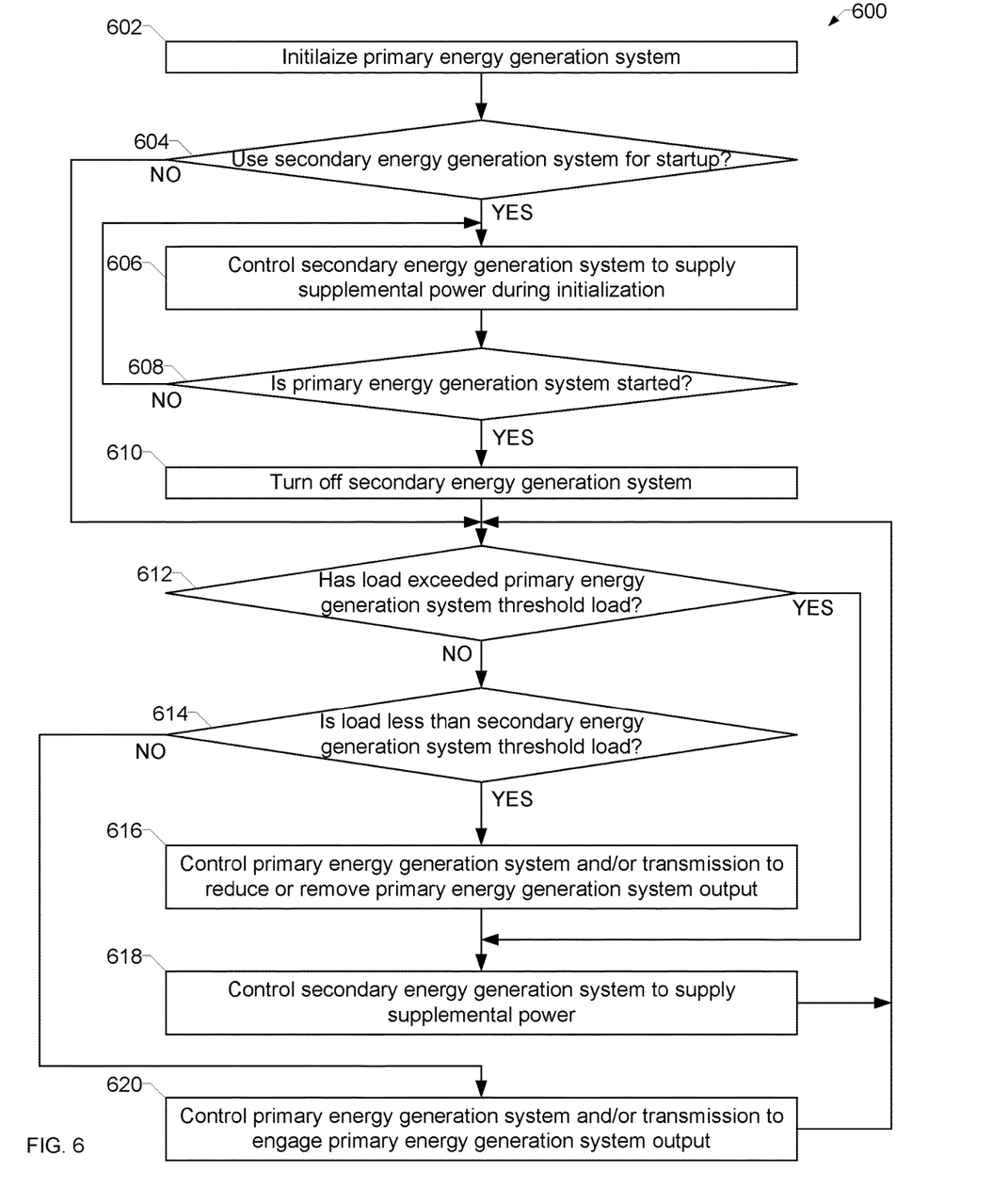
FIG. 6 is a flowchart illustrating example machine readable instructions which may be executed by a processing circuit to implement the controller of FIGS. 1-5 to control primary and/or secondary energy generation devices.

FIG. 6 is a flowchart representative of example machine readable instructions 600 which may be executed by a processing circuit to implement the controller 120 of FIGS. 1-5 to control the primary energy generation system 102, the secondary energy generation system 108, and/or the transmission 402 of FIGS. 1-5. The instructions 600 are described below with reference to the controller 120 of FIGS. 1-5.

At block 602, the controller 120 initializes the primary energy generation system 102. For example, the controller 120 may cause the internal combustion engine 102 to start. During the starting process, at block 604, the controller 120 determines whether to use the secondary energy generation system 108 for the startup process. For example, the controller 120 may determine that assistance is needed with starting the internal combustion engine 102 and/or to that a load is present while the internal combustion engine 102 is starting up.

If the controller 120 determines that the secondary energy generation system 108 is to be used (block 604), at block 606 the controller 120 controls the secondary energy generation system 108 to supply supplemental power during initialization of the internal combustion engine 102. At block 608, the controller 120 determines whether the primary energy generation system 102 has started. If the primary energy generation system 102 has not started (block 608), control returns to block 606). When the primary energy generation system 102 has started (block 608), at block 610 the controller 120 turns off the secondary energy generation system 108.

After the controller 120 turns off the secondary energy generation system 108 (block 610), or if the controller 120 does not use the secondary energy generation system 108 for the startup process (block 604), at block 612 the controller 120 determines whether a load has exceeded a threshold load of the primary energy generation system 102. For example, the controller 120 may monitor the output and/or feedback signals to determine whether the maximum or rated load of the primary energy generation system 102 has been exceeded by the current load (e.g., by some combination of a welding load, pneumatic load, auxiliary power load, and/or hydraulic load).

If the load has not exceeded a threshold load of the primary energy generation system 102 (block 612), at block 614 the controller 120 determines whether a load is less than a threshold load of the secondary energy generation system 108. For example, the controller 120 may use the feedback and/or output signals used in block 612 to further determine whether the load is less than a maximum load of the secondary energy generation system 108 (e.g., whether the secondary energy generation system 108 can support the entirety of the load with supplemental mechanical power).

If the controller 120 determines that the load is less than the threshold load of the secondary energy generation system 108 (block 614), the controller 120 controls the primary energy generation system 102 and/or the transmission 402 to reduce or remove the primary energy generation system output. For example, the controller 120 may reduce to the speed of the primary energy generation system 102, decouple the primary energy generation system 102 output from the load via the transmission 402, and/or turn off the primary energy generation system 102.

After controls the primary energy generation system 102 and/or the transmission 402 to reduce or remove the primary energy generation system output (block 616), or if the load has exceeded a threshold load of the primary energy generation system 102 (block 612), at block 618 the controller 120 controls the secondary energy generation system 108 to supply supplemental power (e.g., the supplemental mechanical power 206, 306, 410, 508 of FIGS. 2-5). If the primary energy generation system 102 is decoupled or disabled, only the supplemental power provides power to the load. On the other hand, if the primary energy generation system 102 is providing power, the supplemental power may increase the peak output of the engine-driven welding-type power supply 100, 200, 300, 400, 500.

If the controller 120 determines that the load is not greater than the threshold load of the primary energy generation system 102 (block 612) and is also not less than the threshold load of the secondary energy generation system 108 (block 614), at block 620 the controller 120 controls the primary energy generation system 102 and/or the transmission 402 to engage the output of the primary energy generation system 102.

After the controller 120 controls the primary energy generation system 102 and/or the transmission 402 to engage the output of the primary energy generation system 102 (block 620) or after controlling the secondary energy generation system 108 to supply supplemental power (block 618), control returns to block 612.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more processors, programmable logic circuits, application specific integrated circuits, and/or any other type of logic circuits and/or processing chips. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y and z." As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. An engine-driven welding-type power supply, comprising:
   a primary energy generation system comprising an internal combustion engine configured to generate mechanical power;
   a generator configured to convert the mechanical power from the internal combustion engine to electric power;
   a welding-type power conditioning circuit to convert the electric power to welding-type power;
   a secondary energy generation system configured to supplement the mechanical power output by the internal combustion engine; and
   a transmission arranged between the primary and secondary energy generation systems, the transmission configured to:
     selectively and individually couple the primary energy generation system to the generator;
     selectively and individually couple the secondary energy generation system to the generator;
     selectively and individually couple the primary energy generation system to the secondary energy generation system; and
     selectively couple both the primary energy generation system and the secondary energy generation system to the generator.

2. The engine-driven welding-type power supply as defined in claim 1, further comprising an energy storage device, the secondary energy generation system configured to supplement the mechanical power using energy from the energy storage device.

3. The engine-driven welding-type power supply as defined in claim 2, wherein the energy storage device comprises at least one of a battery, a kinetic storage device, a capacitor, a super capacitor, or a fuel cell.

4. The engine-driven welding-type power supply as defined in claim 1, further comprising a controller configured to control the secondary energy generation system to provide supplemental mechanical power during a startup period of the primary energy generation system while the internal combustion engine increases speed to a commanded speed.

5. The engine-driven welding-type power supply as defined in claim 1, further comprising an auxiliary power circuit configured to convert the electric power to at least one of alternating current (AC) electric power or direct current (DC) electric power.

6. The engine-driven welding-type power supply as defined in claim 1, wherein the generator is configured to output AC electric power.

7. The engine-driven welding-type power supply as defined in claim 1, wherein the secondary energy generation system comprises at least one of an air-driven motor, a hydraulic motor, an electric motor, or a second internal combustion engine.

8. The engine-driven welding-type power supply as defined in claim 7, wherein the primary energy generation system is configured to provide the mechanical power to the at least one of the air-driven motor, the hydraulic motor, or the electric motor.

9. The engine-driven welding-type power supply as defined in claim 1, further comprising a controller configured to control the secondary energy generation system based on a load on the primary energy generation system exceeding a rated load.

10. The engine-driven welding-type power supply as defined in claim 1, further comprising a controller configured to control the secondary energy generation system to reduce a torque oscillation of the primary energy generation system by controlling the secondary energy generation system to generate an oscillating torque having a phase shift relative to the torque oscillation of the primary energy generation system and inject the phase shifted oscillating torque from the secondary energy generation system to the primary energy generation system such that the torque oscillates between a primary power generation mode and a secondary power generation mode to alternate between absorbing power and delivering power.

11. The engine-driven welding-type power supply as defined in claim 1, further comprising a controller configured to control the secondary energy generation system to provide the mechanical power while the primary energy generation system is not providing the mechanical power.

12. The engine-driven welding-type power supply as defined in claim 1, wherein the generator comprises a first winding and a second winding, the welding-type power conditioning circuit coupled to the first winding and the secondary energy generation system coupled to the second winding.

13. The engine-driven welding-type power supply as defined in claim 1, wherein the generator is configured to output single-phase AC power or three-phase AC power.

14. An engine-driven welding-type power supply, comprising:
   a primary energy generation system comprising an internal combustion engine configured to generate mechanical power;
   a generator configured to convert the mechanical power from the internal combustion engine to electric power;
   a welding-type power conditioning circuit to convert the electric power to welding-type power;
   a secondary energy generation system configured to supplement the mechanical power output by the internal combustion engine; and
   a controller configured to control the secondary energy generation system to reduce a torque oscillation of the primary energy generation system by controlling the secondary energy generation system to generate an oscillating torque having a phase shift relative to the torque oscillation of the primary energy generation system and inject the phase shifted oscillating torque from the secondary energy generation system to the primary energy generation system such that the torque oscillates between a primary power generation mode and a secondary power generation mode to alternate between absorbing power and delivering power.

15. An engine-driven welding-type power supply, comprising:
   a primary energy generation system comprising an internal combustion engine configured to generate mechanical power;
   a generator configured to convert the mechanical power from the internal combustion engine to electric power;

a welding-type power conditioning circuit to convert the electric power to welding-type power;

a secondary energy generation system comprising an electric motor configured to supplement the mechanical power output by the internal combustion engine; and a mechanical linkage system arranged between the primary and secondary energy generation systems, the mechanical linkage system configured to:
- selectively and individually couple the primary energy generation system to the generator;
- selectively and individually couple the secondary energy generation system to the generator; and
- selectively couple both the primary energy generation system and the secondary energy generation system to the generator.

16. The engine-driven welding-type power supply as defined in claim 1, wherein the transmission forms a direct link between the primary energy generation system and the secondary energy generation system.

17. The engine-driven welding-type power supply as defined in claim 15, wherein the mechanical linkage system is further configured to selectively and individually couple the primary energy generation system to the secondary energy generation system.

* * * * *